United States Patent
Boehm

(10) Patent No.: US 10,763,061 B2
(45) Date of Patent: Sep. 1, 2020

(54) DRIVE ROD AND METHOD OF MANUFACTURING A DRIVE ROD

(71) Applicant: GENERAL ELECTRIC TECHNOLOGY GMBH, Baden (CH)

(72) Inventor: Gerrit Boehm, Hesse (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 16/326,516

(22) PCT Filed: Aug. 18, 2017

(86) PCT No.: PCT/EP2017/070900
§ 371 (c)(1),
(2) Date: Feb. 19, 2019

(87) PCT Pub. No.: WO2018/033612
PCT Pub. Date: Feb. 22, 2018

(65) Prior Publication Data
US 2019/0206643 A1  Jul. 4, 2019

(30) Foreign Application Priority Data
Aug. 19, 2016 (EP) .................... 16185033

(51) Int. Cl.
*H01H 3/46* (2006.01)
*H01H 3/32* (2006.01)
(Continued)

(52) U.S. Cl.
CPC ............. *H01H 33/42* (2013.01); *F16C 3/023* (2013.01); *H01H 3/46* (2013.01); *H01H 11/00* (2013.01);
(Continued)

(58) Field of Classification Search
CPC ...... H01H 3/46; H01H 3/54; H01H 2003/326; H01H 2003/323; H01H 33/42;
(Continued)

(56) References Cited

U.S. PATENT DOCUMENTS

| 6,444,939 B1 * | 9/2002 | Crookston ........... H01H 1/5822 218/120 |
| 6,753,493 B2 * | 6/2004 | Rhein ................ H01H 33/6662 218/120 |

(Continued)

FOREIGN PATENT DOCUMENTS

| DE | 3047644 A1 | 1/1982 |
| DE | 3514184 A1 | 10/1986 |

OTHER PUBLICATIONS

European Search Report and Written Opinion dated Nov. 23, 2016 which was issued in connection with EP16185033.4 which was filed on Aug. 19, 2016.
(Continued)

*Primary Examiner* — William A Bolton
(74) *Attorney, Agent, or Firm* — Eversheds Sutherland (US) LLP

(57) ABSTRACT

The invention relates to a drive rod for driving a movable contact element of a high-voltage switching device, wherein said drive rod comprises a first section for connecting said drive rod to a drive mechanism, a second section for connecting said drive rod to said movable contact element, and an intermediate section between said first section and said second section, characterized in that said intermediate section comprises coupling means for rotatably coupling said first section to said second section.

13 Claims, 14 Drawing Sheets

(51) Int. Cl.
  *H01H 11/00*   (2006.01)
  *H01H 33/42*   (2006.01)
  *F16C 3/02*    (2006.01)
(52) U.S. Cl.
  CPC . *H01H 2003/323* (2013.01); *H01H 2003/326* (2013.01)
(58) Field of Classification Search
  CPC .. H01H 33/46; H01H 2033/426; H01H 11/00; F16C 3/023
  USPC .......... 218/154, 153, 140, 120, 124
  See application file for complete search history.

(56) References Cited

U.S. PATENT DOCUMENTS

| | | | | |
|---|---|---|---|---|
| 6,917,006 B2 * | 7/2005 | Bachofen | ............ | H01H 3/3052 |
| | | | | 200/318.2 |
| 7,115,831 B2 * | 10/2006 | Chyla | .................. | H01H 1/5833 |
| | | | | 218/124 |
| 7,796,374 B2 * | 9/2010 | Mori | ...................... | H01H 33/42 |
| | | | | 218/120 |
| 8,963,039 B2 * | 2/2015 | Ohda | ..................... | H01H 33/50 |
| | | | | 218/143 |
| 9,217,462 B2 * | 12/2015 | Horvath | .................. | F16D 1/101 |
| 2015/0007694 A1 | 1/2015 | Horvath | | |

OTHER PUBLICATIONS

International Search Report and Written Opinion dated Nov. 7, 2017 which was issued in connection with PCT/EP2017/070900 which was filed on Aug. 18, 2017.

* cited by examiner

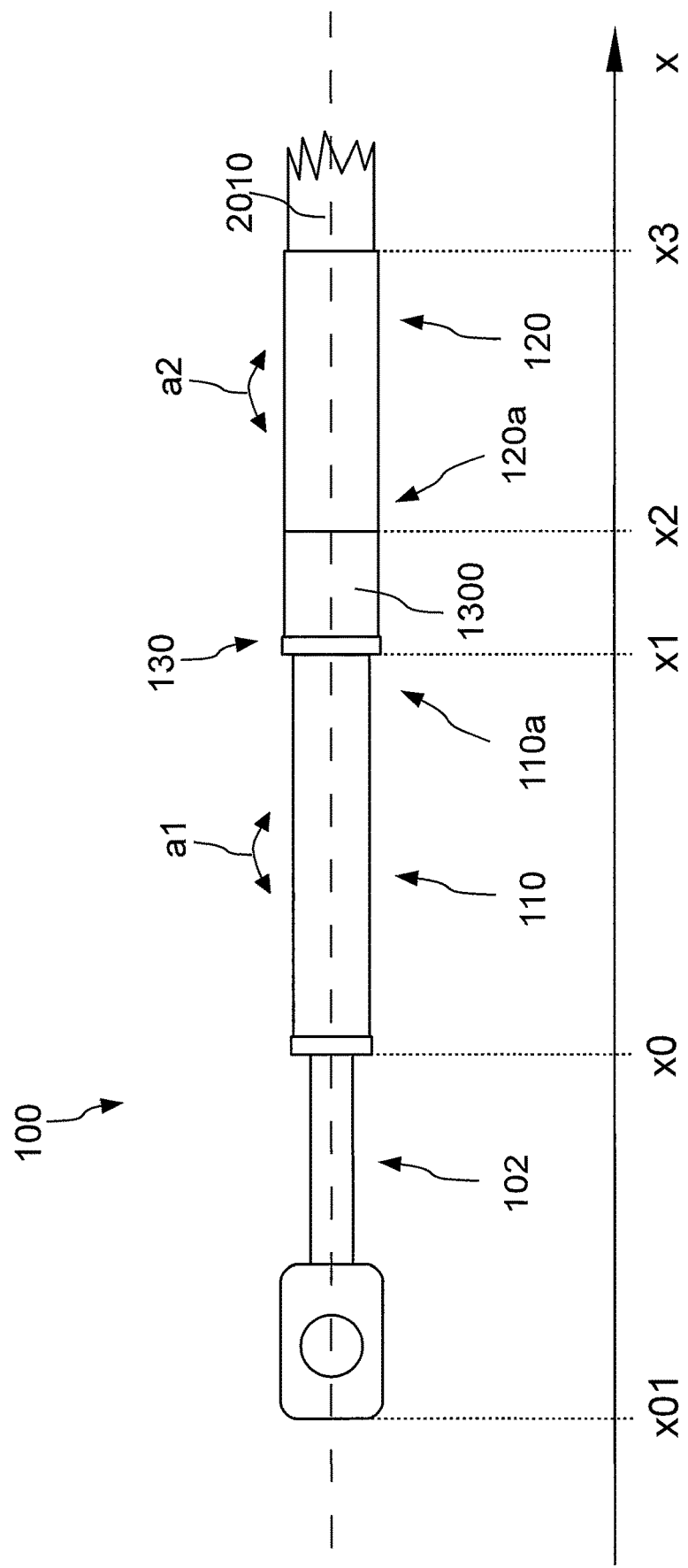

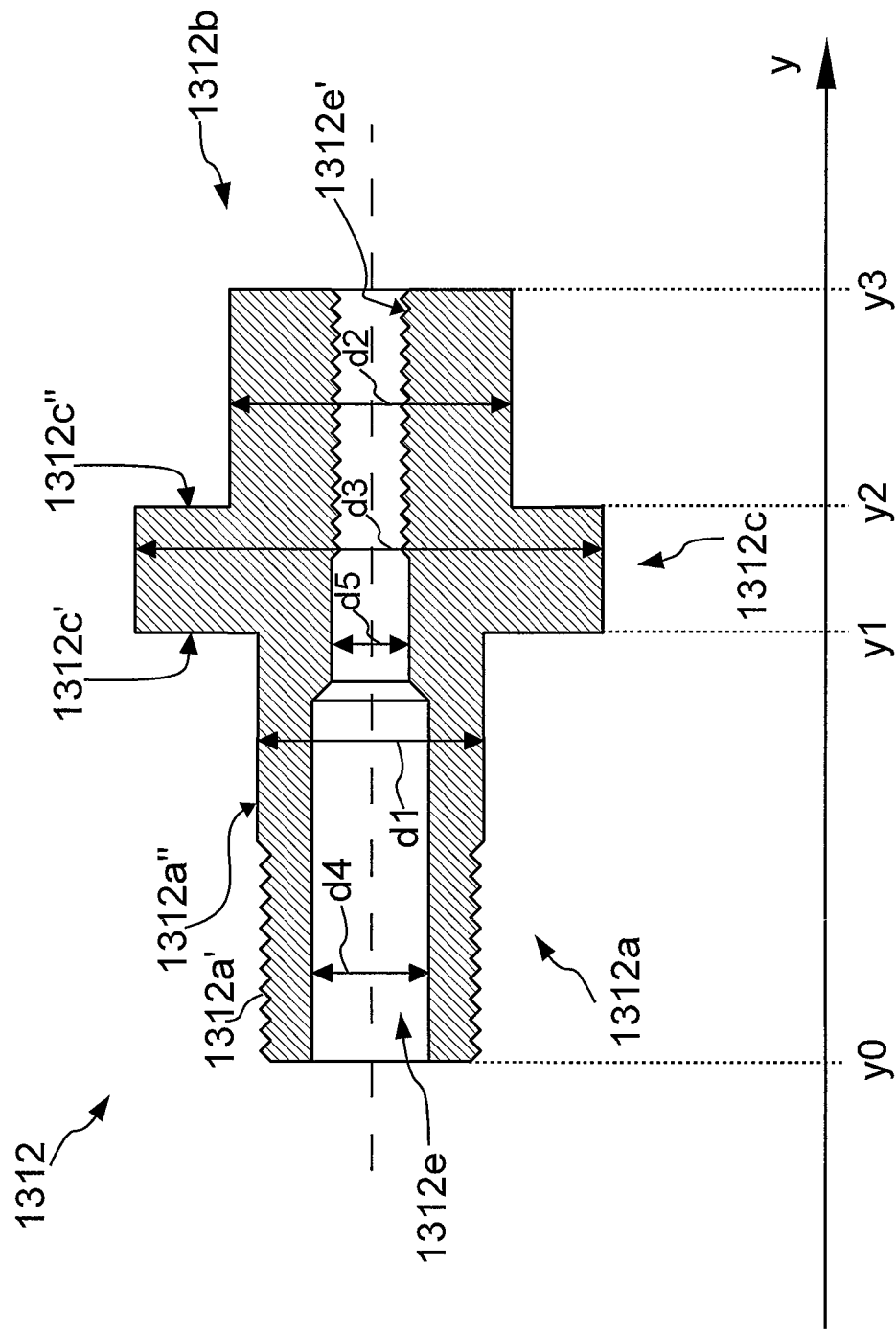

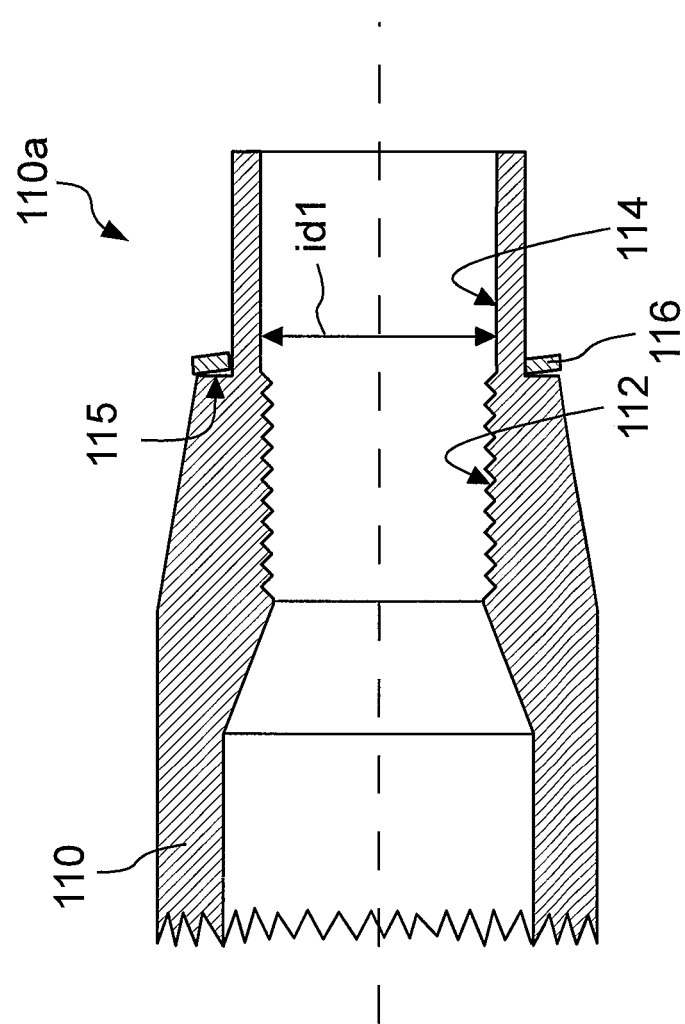

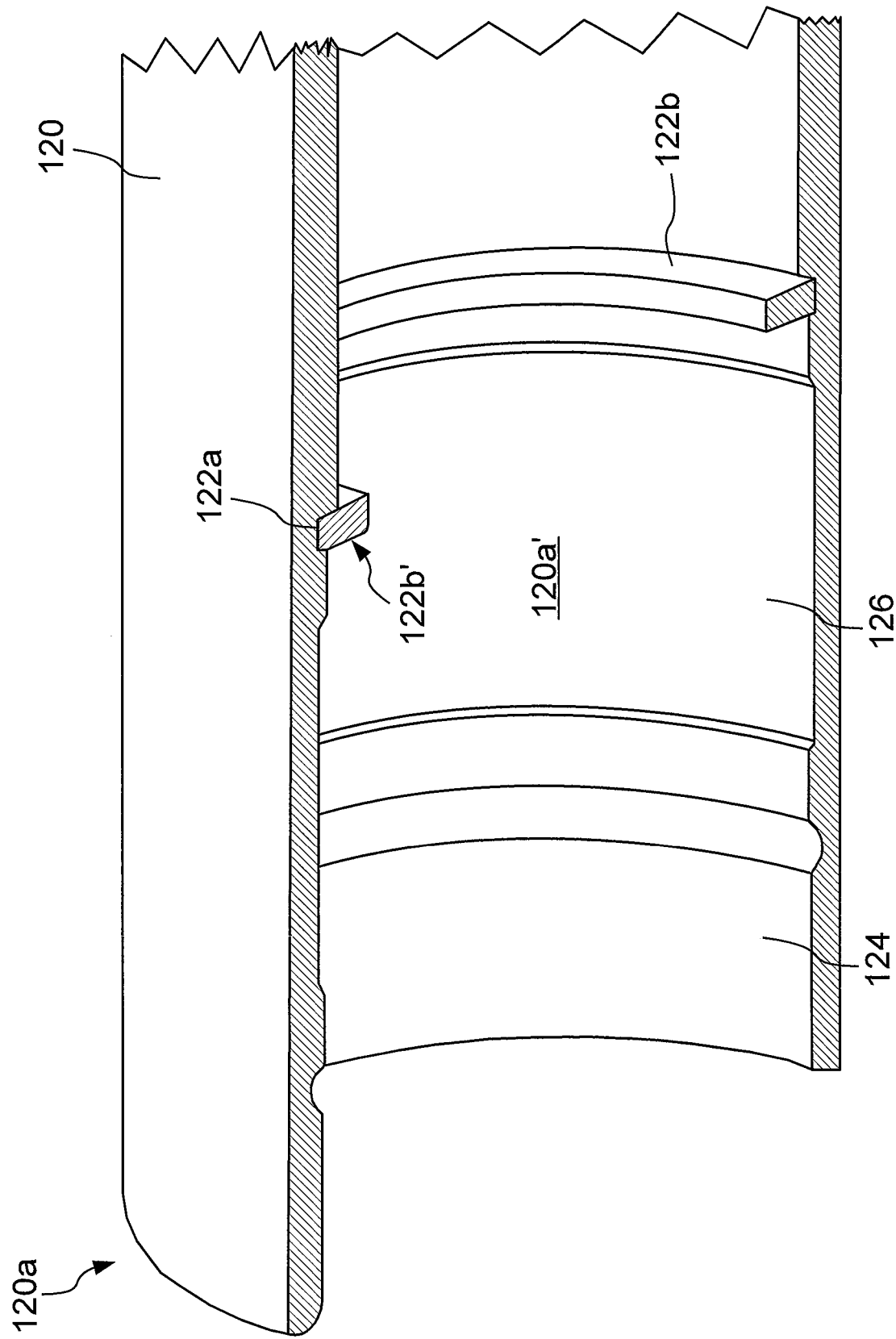

DRIVE ROD AND METHOD OF MANUFACTURING A DRIVE ROD

FIELD OF THE DISCLOSURE

The invention relates to a drive rod for driving a movable contact element of a high-voltage switching device, wherein said drive rod comprises a first section for connecting said drive rod to a drive mechanism, a second section for connecting said drive rod to said movable contact element, and an intermediate section between said first section and said second section.

The invention further relates to a method of manufacturing a drive rod of the aforementioned type.

BACKGROUND

A drive rod of the aforementioned type is disclosed by U.S. Pat. No. 6,583,375 B2. The known drive rod lacks operational flexibility as it provides only few possibilities for compensating misalignments of the components connected to it.

SUMMARY

In view of this, it is an object of the present invention to provide an improved drive rod which offers an increased operational flexibility and avoids the abovementioned disadvantages of prior art and a method of manufacturing such drive rod.

According to the present invention, regarding the drive rod of the abovementioned type, this object is achieved by said intermediate section comprising coupling means for rotatably coupling said first section to said second section. This enables the first section of said drive rod to freely rotate with respect to said second section of said drive rod thus enabling a compensation of misalignments of a drive mechanism with respect to the drive rod and/or of the drive rod with respect to the movable contact element driven by the drive rod.

A misalignment between the drive mechanism and the drive rod may e.g. be compensated by rotating the first section of the drive rod with respect to the second section of the drive rod, and a misalignment between the drive rod and the movable contact element or any other component driven by and for this purpose connected to the second section of the drive rod may e.g. be compensated by rotating the second section of the drive rod with respect to the first section of the drive rod.

According to an embodiment, the coupling means are configured such that they enable a free relative rotation between said first and second sections of the drive rod, with no angular limitation. In other words, an unlimited number of full turns of e.g. the first section relative to the second section is possible.

According to further embodiments, the coupling means may be configured such that they enable a free relative rotation between said first and second sections of the drive rod, which is, however, limited with respect to a maximum angular distance traveled during such rotation, such as e.g. to about one full turn, i.e. 360 degrees. Other values for such limitation of angular distance are also possible, either less than 360 degrees or greater than 360 degrees.

The free rotatability attained by the principle according to the embodiments is particularly beneficial in cases where the drive rod is driven by a drive mechanism comprising a planar gear mechanism such as e.g. crank gear, wherein the free rotatability contributes to avoiding a blocking state of the crank gear in cases of misalignments of the components relative to each other.

Moreover, generally, the free rotatability enables to reduce mechanical stress and friction losses in components connected thereto, which increases durability and service life of the drive rod and the switchgear comprising the drive rod, and which at the same time reduces the amount of energy required for driving the movement of the movable contact element or component connected to the second section of the drive rod. Particularly, the switching energy required for attaining short breaking times may also be reduced by employing the principle according to the embodiments.

Further, requirements regarding a precise mounting and alignment of the involved components with respect to each other are reduced.

According to a further embodiment, as already indicated above, instead of (directly) connecting a movable contact element of the high-voltage switching device to the second section of the drive rod, it is also possible to connect any other component such as a further drive rod and/or a gear mechanism and/or a crank or the like to said second section of the drive rod. Such configurations may e.g. be used for driving one or more pistons used for increasing an insulating gas pressure in a switching chamber of the switching device.

According to a further embodiment, said first section and said second section are coupled to each other by said coupling means substantially free from any axial play, wherein said axial play between the first section and the second section is less than 3 millimeters, mm, particularly less than 0.5 mm, which reduces stroke losses during switching actions. This also contributes to increased durability and service life and at the same time reduces the amount of energy required for driving the movement of the movable contact element or component connected to the second section of the drive rod. Particularly, the switching energy required for attaining short breaking times may also be reduced by reducing the axial play. Still further, a significant reduction of the breaking time may be attained, too.

Further, numerous embodiments explained in detail below enable full control of an alignment of components during a process of manufacturing and/or an assembly process of the drive rod, wherein especially the alignment and state of the involved components may be visually inspected, which reduces errors during assembly.

According to a further embodiment, said first section and/or said second section has a basically hollow cylindrical shape, which reduces an overall mass of the functional (switching) chain comprising the drive rod, thus also contributing to reduced energy consumption and short switching times.

Although according to some embodiments, a hollow circular cylindrical shape, e.g. pipe form, according to further embodiments, other hollow cylindrical shapes than circular cylindrical shapes may be provided.

According to an embodiment, only the first section of the drive rod comprises a hollow (circular) cylindrical shape, whereas the second section may comprise a different, e.g. solid, shape, or vice versa.

According to a further embodiment, a respective axial end section of at least one of said first and second sections facing said coupling means comprise a basically hollow cylindrical shape, which enables an efficient (at least partial) integration of said coupling means into said respective axial end section(s).

According to an embodiment, both the first section and the second section of the drive rod comprise a hollow circular cylindrical shape, i.e. pipe shape, wherein an outer diameter of said pipe shaped first and second sections is different. According to further embodiments, however, said outer diameter of said pipe shaped first section may also be equal to the outer diameter of the pipe shaped second section.

According to a further embodiment, said coupling means comprise a bearing assembly having a bearing carrier, a first axial bearing (also denoted as thrust bearing) arranged on said bearing carrier, and a second axial bearing (also denoted as thrust bearing) arranged on said bearing carrier. This configuration is particular in that the free rotatability as well as a reduced or even substantially zero axial play is attained while requiring comparatively few available space. Also, this configuration may efficiently be integrated in a drive rod having pipe-shaped first and/or second sections. Still further, due to the reduced friction losses effected by the bearings, less particles, which could reduce dielectric strength of the switching device, may form within the drive rod and its environment According to a further embodiment, said first axial bearing and/or said second axial bearing is an axial ball bearing (also denoted as ball thrust bearing).

According to a further embodiment, said bearing carrier comprises a first axial end section with a basically circular cylindrical shape having a first outer diameter, a second axial end section with a basically circular cylindrical shape having a second outer diameter for receiving said second axial bearing, and an intermediate bearing section with a basically circular cylindrical shape having a third outer diameter, wherein said third outer diameter is greater than said first outer diameter and said second outer diameter, so that the first and second axial bearings may easily be mounted and secured at said bearing carrier.

According to a further embodiment, said bearing carrier comprises first coupling means for mechanically coupling said first axial end section of the bearing carrier to said first section of the drive rod, wherein said first coupling means comprise at least one of: an external thread section, an external press-fit section. This ensures an efficient and precise assembly of the drive rod, which may even be done in the field, e.g. by a service technician.

According to a further embodiment, said bearing carrier comprises at its second axial end section an internal thread section, which facilitates using an assembling aid for securing the second axial bearing to the bearing carrier. For example, according to an embodiment, once the second axial bearing is placed on the second axial end section of the bearing carrier, a threaded bolt and a wave spring may be installed in said internal thread section which enables to at least temporarily press said second axial bearing against the bearing carrier, particularly against an axial front surface (having circular ring shape) of the intermediate bearing section.

According to a further embodiment, said second section comprises a hollow axial end section for receiving the bearing assembly and locking means for locking said bearing assembly within said hollow axial end section and in a predetermined axial position relative to said second section, wherein said locking means comprise at least one of: an annular shoulder, a locking ring, a locking nut. This enables to precisely mount the bearing assembly in a predetermined position within the second section and to keep it in place is said position.

According to a further embodiment, said first section comprises second coupling means for engaging with said first coupling means of said bearing carrier, wherein said second coupling means comprise at least one of: an internal thread section for engaging said external thread section of the bearing carrier, an internal press-fit section for engaging said external press-fit section of the bearing carrier. Thus, the bearing carrier may securely be attached to the first section.

The drive rod according to the embodiments may e.g. be used within a high-voltage switching device comprising a movable contact element and a drive mechanism for driving said movable contact element, said drive rod connecting said drive mechanism with said movable contact element.

According to further embodiments, it is also possible to connect any other component such as a further drive rod and/or a gear mechanism and/or a crank of the switching device or the like to said second section of the drive rod. Such configurations may e.g. be used for driving one or more pistons used for increasing an insulating gas pressure in a switching chamber of the switching device.

According to a further embodiment of the switching device, said drive mechanism may comprise a crank gear or another type of planar gear.

A further solution to the object of the present invention is provided by a method of manufacturing a drive rod for driving a movable contact element of a high-voltage switching device, wherein said drive rod comprises a first section for connecting said drive rod to a drive mechanism, a second section for connecting said drive rod to said movable contact element, and an intermediate section between said first section and said second section. The method is characterized by the following steps: providing said first section, providing said second section, and coupling said first section to said second section with coupling means that are configured for rotatably coupling said first section to said second section. Rotatably coupling said first and second sections in the course of the method according to the embodiments yields the same advantages as mentioned above with respect to the drive rod and its embodiments.

According to an embodiment, said coupling means comprise a bearing assembly having a bearing carrier, a first axial bearing arranged on said bearing carrier, and a second axial bearing arranged on said bearing carrier, wherein said step of coupling further comprises the following steps: coupling a first axial end section of said bearing carrier with said axial end section of said first section, inserting a second axial end section of said bearing carrier into a hollow axial end section of said second section, locking said bearing assembly within said hollow axial end section and in a predetermined axial position relative to said second section with locking means. This enables an easy, efficient and precise assembly of the drive rod, even in the field, because first the bearing carrier is connected to said first section, resulting in an assembly subcomponent, and after that, said subcomponent may be connected to and locked with the second section, whereby assembly of the drive rod is completed. Further, during the complete assembly process, the alignment and state of the involved components may be visually inspected, which reduces errors during assembly.

According to a further embodiment, said hollow axial end section of said second section comprises an internal thread section, wherein said locking means comprise a locking nut having an external thread section for engaging with said internal thread section of said hollow axial end section, and an annular shoulder within said hollow axial end section, wherein said annular shoulder is arranged axially inwards of said internal thread section, wherein said step of providing said first section comprises mounting said locking nut over an axial end section of said first section, and wherein said step of locking said bearing assembly within said hollow axial end section comprises tightening said locking nut to said internal thread section of said hollow axial end section until the bearing assembly is pressed onto the annular shoulder. This procedure enables a precise mounting of the bearing carrier within the second section. The annual shoulder is comparatively easy to provide within a pipe-shaped second section by providing an annular notch within the radially inner surface and placing a locking ring within said notch. A closed locking ring is used which enables reliable transmission of axial forces between the bearing assembly and the second section.

According to a further embodiment, said method further comprises: at least temporarily securing at least one of said first and second axial bearings to the bearing carrier by means of at least one wave spring, which facilitates mounting of the bearings by preventing single components of said bearings to loosen before the bearing assembly is coupled to the first and second sections of the drive rod. This embodiment is particularly as it enables to reliably secure the bearings to the bearing carrier thus obtaining a completely mounted subcomponent, which may subsequently be coupled with the first and second sections of the drive rod. During these subsequent coupling steps of the assembly process, the bearings are secured within said subcomponent of the bearing carrier by means of e.g. the wave springs.

BRIEF DESCRIPTION OF THE FIGURES

Further features and aspects of the present invention are given in the following detailed description with reference to the drawings in which.

DETAILED DESCRIPTION

Figure 1B:
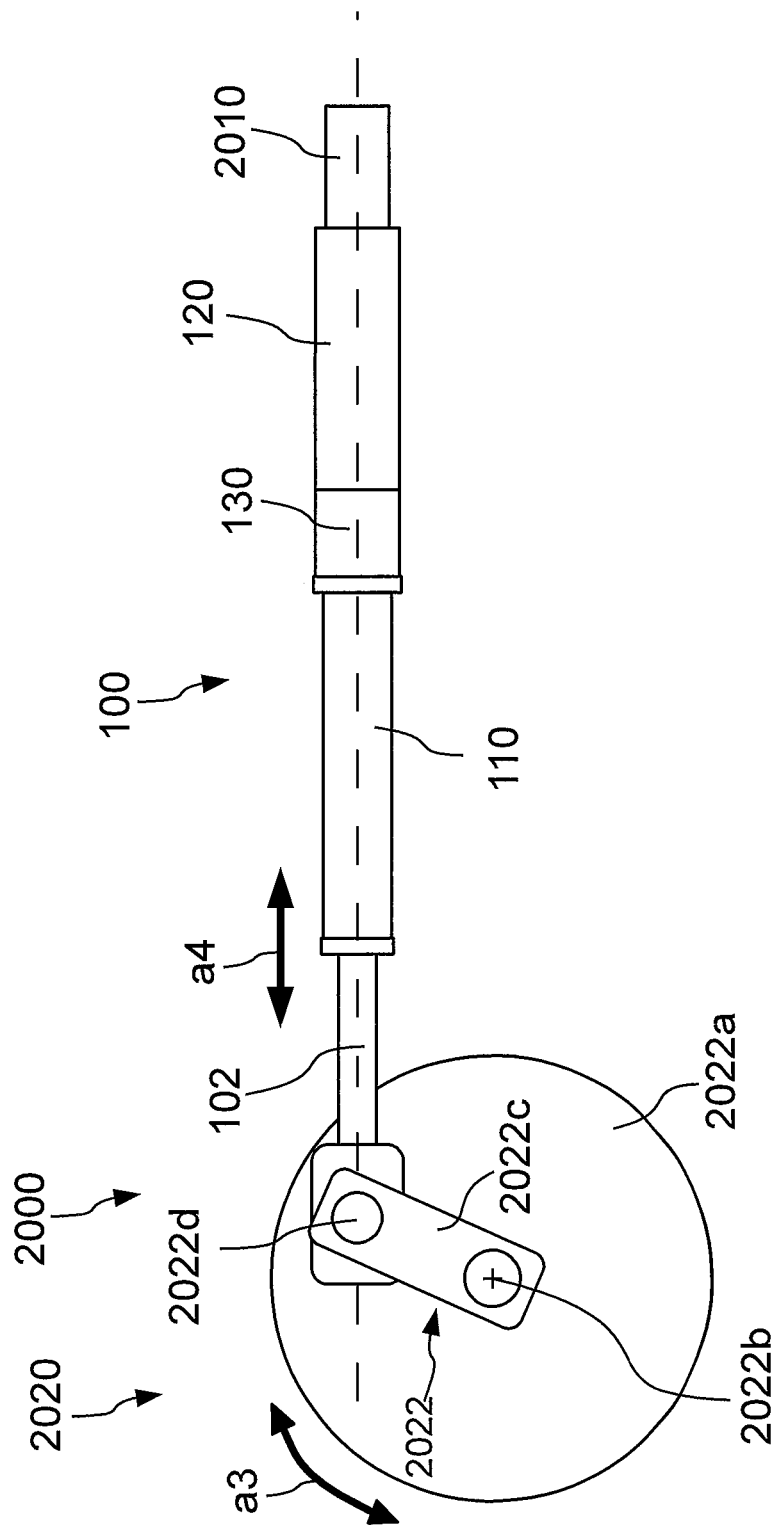
FIG. 1A schematically depicts a side view of a drive rod according to an embodiment, FIG. 1B schematically depicts a side view of a switching device with a drive rod according to an embodiment, FIG. 2A schematically depicts a cross-sectional side view of a bearing carrier according to an embodiment, FIG. 2B schematically depicts a cross-sectional side view of a bearing assembly with a bearing carrier according to FIG. 2A, FIG. 3A schematically depicts a perspective view of an axial end portion of a first section of a drive rod according to an embodiment, FIG. 3B schematically depicts a cross-sectional side view of the configuration of FIG. 3A, FIG. 4A schematically depicts a perspective view of an axial end portion of a second section of a drive rod according to an embodiment, FIG. 4B schematically depicts a cross-sectional side view of the configuration of FIG. 4A, FIG. 5A to 5F schematically depict a cross-sectional side view of a drive rod according to an embodiment in different subsequent states of assembly, FIG. 6 schematically depicts a cross-sectional side view of a drive rod according to an embodiment, FIG. 7 schematically depicts a cross-sectional side view of a drive rod according to a further embodiment, FIG. 8 schematically depicts a simplified flow-chart of a method of manufacturing a drive rod according to an embodiment, and FIG. 9 schematically depicts a simplified flow-chart of aspects of a method of manufacturing a drive rod according to a further embodiment.

FIG. 1A schematically depicts a side view of a drive rod 100 for a high-voltage switching device according to an embodiment, and FIG. 1B schematically depicts a side view of said drive rod 100 mounted within a high-voltage switching device 2000.

The drive rod 100 is used for driving a movable contact element 2010 of the high-voltage switching device 2000, which may e.g. form part of a high-voltage circuit breaker. For this purpose, a first (longitudinal) section 110 of the drive rod 100 is connected to a drive mechanism 2020 (FIG. 1B), which may e.g. comprise a crank gear 2022, and a second (longitudinal) section 120 of said drive rod 100 is connected to said movable contact element 2010.

According to the principle of the embodiments, an intermediate section 130 of said drive rod 100 is provided between said first section 110 and said second section 120, and said intermediate section 130 comprises coupling means 1300 for rotatably coupling said first section 110 to said second section 120. This enables the first section 110 of said drive rod 100 to freely rotate with respect to said second section 120 of said drive rod 100 thus enabling a compensation of misalignments of the drive mechanism 2020 (FIG. 1B) with respect to the drive rod 100 and/or of the drive rod 100 with respect to the movable contact element 2010 driven by the drive rod 100.

According to an embodiment, the coupling means 1300 are configured such that they enable a free relative rotation between said first and second sections 110, 120 of the drive rod 100, with no angular limitation.

The free rotatability attained by the principle according to the embodiments, which is symbolized in FIG. 1A by the double arrows a1, a2, is particularly beneficial in cases where the drive rod 100 is driven by a drive mechanism 2020 comprising a planar gear mechanism such as e.g. crank gear 2022, cf. FIG. 1B, wherein the free rotatability contributes to avoiding a blocking state of the crank gear 2022 in cases of misalignments of the components 100, 2010, 2020, 2022 relative to each other.

The crank gear 2022 of the switching device 2000 of FIG. 1B comprises in a per se known manner a wheel 2022a arranged rotatable around an axis 2022b, to which a crank 2022c is attached in a torque proof manner. The crank 2022c is further coupled to a connecting rod 102 that couples the crank 2022c with the first section 110 of the drive rod 100. Thus, a rotary motion a3 of the wheel 2022a may be transformed into a basically longitudinal motion a4 of the drive rod 100, wherein said longitudinal motion a4 e.g. effects switching actions of the contact element 2010.

As already mentioned above, the free rotatability a1, a2 (FIG. 1A) of the components 110, 120 with respect to each other enables a compensation of misalignments of the drive mechanism 2020 (FIG. 1B) with respect to the drive rod 100 and/or of the drive rod 100 with respect to the movable contact element 2010 driven by the drive rod 100 and thus increases durability and reduces energy consumption for driving the movement a4.

According to a further embodiment, instead of (directly) connecting a movable contact element 2010 (FIG. 1B) of the high-voltage switching device 2000 to the second section 120 of the drive rod 100, it is also possible to connect any other component (not shown) such as a further drive rod and/or a gear mechanism and/or a crank or the like to said second section 120 of the drive rod 100.

According to a further embodiment, said first section 110 and said second section 120 (FIG. 1A) are coupled to each other by said coupling means 1300 substantially free from any axial play, wherein said axial play between the first section 110 and the second section 120 is less than 3 millimeters, mm, particularly less than 0.5 mm, which reduces stroke losses during switching actions. This also contributes to increased durability and service life and at the same time reduces the amount of energy required for driving the movement of the movable contact element 2010.

FIG. 1A also depicts a horizontal coordinate axis x in parallel to the longitudinal axis of the drive rod 100. As can be seen, the first section 110 of the drive rod 100 extends from a first coordinate x0 to a second coordinate x1, the intermediate section 130 extends from said second coordinate x1 to a third coordinate x2, and the second section 120 extends from said third coordinate x2 to a fourth coordinate x3.

Also depicted is a further coordinate x01, wherein the connecting rod 102 extends between the further coordinate x01 and the first coordinate. The connecting rod 102 may e.g. comprise a threaded section (not shown) at its right end portion as depicted by FIG. 1A for coupling with a corresponding inner threaded section (not shown) of the first section 110. Also, the connecting rod 102 may be further secured in a specific mounting position within said first section 110, e.g. by counter nut (not shown) engaging said threaded section of the connecting rod 102.

According to an embodiment, the length of the first section 110 between the coordinates x0, x1 may range between 50 millimeter (mm) and 250 mm, the length of the second section 120 between the coordinates x2, x3 may range between 50 mm and 300 mm, and the length of the intermediate section 130 between the coordinates x1, x2 may range between 30 mm and 100 mm.

According to an embodiment, both the first section 110 and the second section 120 of the drive rod 100 comprise a hollow circular cylindrical shape, i.e. pipe shape, wherein an outer diameter of said pipe shaped first and second sections is different. According to further embodiments, however, said outer diameter of said pipe shaped first section may also be equal to the outer diameter of the pipe shaped second section.

According to a further embodiment, said coupling means 1300 comprise a bearing assembly having a bearing carrier 1312 an embodiment of which is schematically depicted in form of a cross-sectional side view according to FIG. 2A.

Figure 2B:
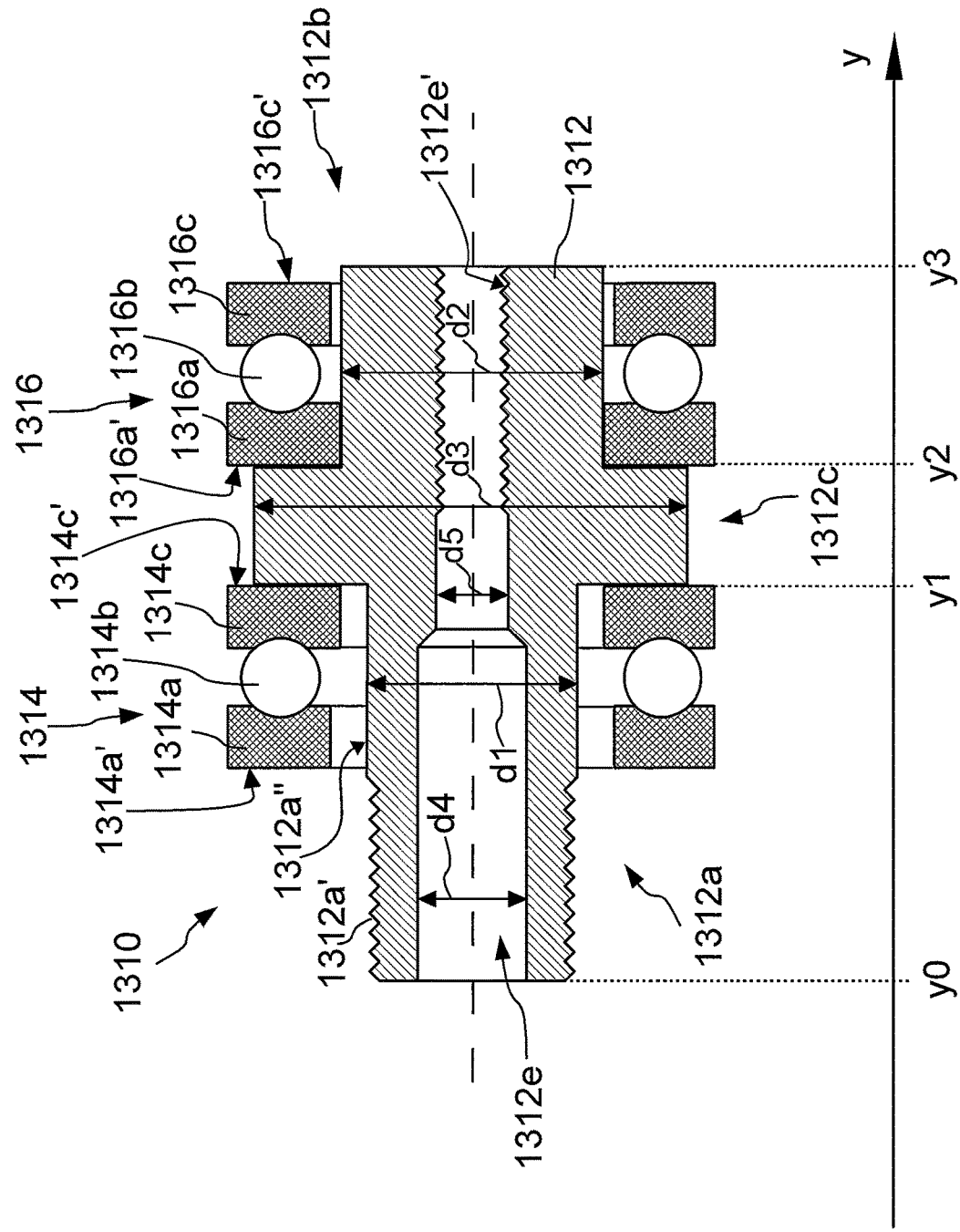

Said bearing carrier 1312 comprises a first axial end section 1312a with a basically circular cylindrical shape having a first outer diameter d1 for receiving a first axial bearing 1314 (FIG. 2B), a second axial end section 1312b (FIG. 2A) with a basically circular cylindrical shape having a second outer diameter d2 for receiving said second axial bearing 1316 (FIG. 2B), and an intermediate bearing section 1312c with a basically circular cylindrical shape having a third outer diameter d3, wherein said third outer diameter d3 is greater than said first outer diameter d1 and said second outer diameter d2, so that the first and second axial bearings 1314, 1316 may easily be mounted and secured at said bearing carrier 1312, whereby the bearing assembly 1310 schematically depicted by FIG. 2B is obtained.

The first axial end section 1312a extends between coordinates y0, y1 of the horizontal coordinate axis y of FIGS. 2A and 2B, the second axial end section 1312b extends between coordinates y2, y3, and the intermediate bearing section 1312c extends between coordinates y1, y2 of the horizontal coordinate axis y.

According to an embodiment, the length of the first axial end section 1312a between the coordinates y0, y1 may range between 30 mm and 100 mm, the length of the second axial end section 1312b between the coordinates y2, y3 may range between 5 mm and 30 mm, and the length of the intermediate bearing section 1312c between the coordinates y1, y2 may range between 5 mm and 20 mm.

As can be seen from FIG. 2B, which depicts the bearing carrier of FIG. 2A together with two bearings 1314, 1316, the first axial bearing 1314, which is an axial ball bearing, comprises a first bearing shell 1314a, a second bearing shell 1314c, and balls 1314b arranged between the bearing shells. Similarly, the second axial bearing 1316, which is also an axial ball bearing, comprises a first bearing shell 1316a, a second bearing shell 1316c, and balls 1316b arranged between the bearing shells. The surface 1314c' of the bearing shell 1314c is supported by a first face 1312c' of the intermediate bearing section 1312c, and the surface 1316a' of the bearing shell 1316a is supported by a second face 1312c'' of the intermediate bearing section 1312c. Note that the configuration of FIG. 2A is primarily for illustrative purposes, not representing a proper mounting state of the first bearing 1314 with respect to the bearing carrier 1312. Especially, the first bearing 1314 is not secured radially at the first axial end section 1312a, but may be mounted onto the first section 110 of the drive rod as explained further below e.g. with respect to FIG. 5C.

The bearing carrier 1312 may further comprise a bore 1312e with a fourth diameter d4 along coordinate range y0, y1 and with a fifth diameter d5 substantially along coordinate range y1, y3.

According to a further embodiment, said bearing carrier 1312 comprises first coupling means 1312a', 1312a'' for mechanically coupling said first axial end section 1312a of the bearing carrier 1312 to said first section 110 (FIG. 1A) of the drive rod 100. Presently, said first coupling means comprise an external thread section 1312a' and an external press-fit section 1312a''.

The first coupling means 1312a', 1312a'' may engage with corresponding second coupling means provided at an axial end section 110a (FIG. 1A) of the first section 110 of the drive rod 100.

Figure 3A:
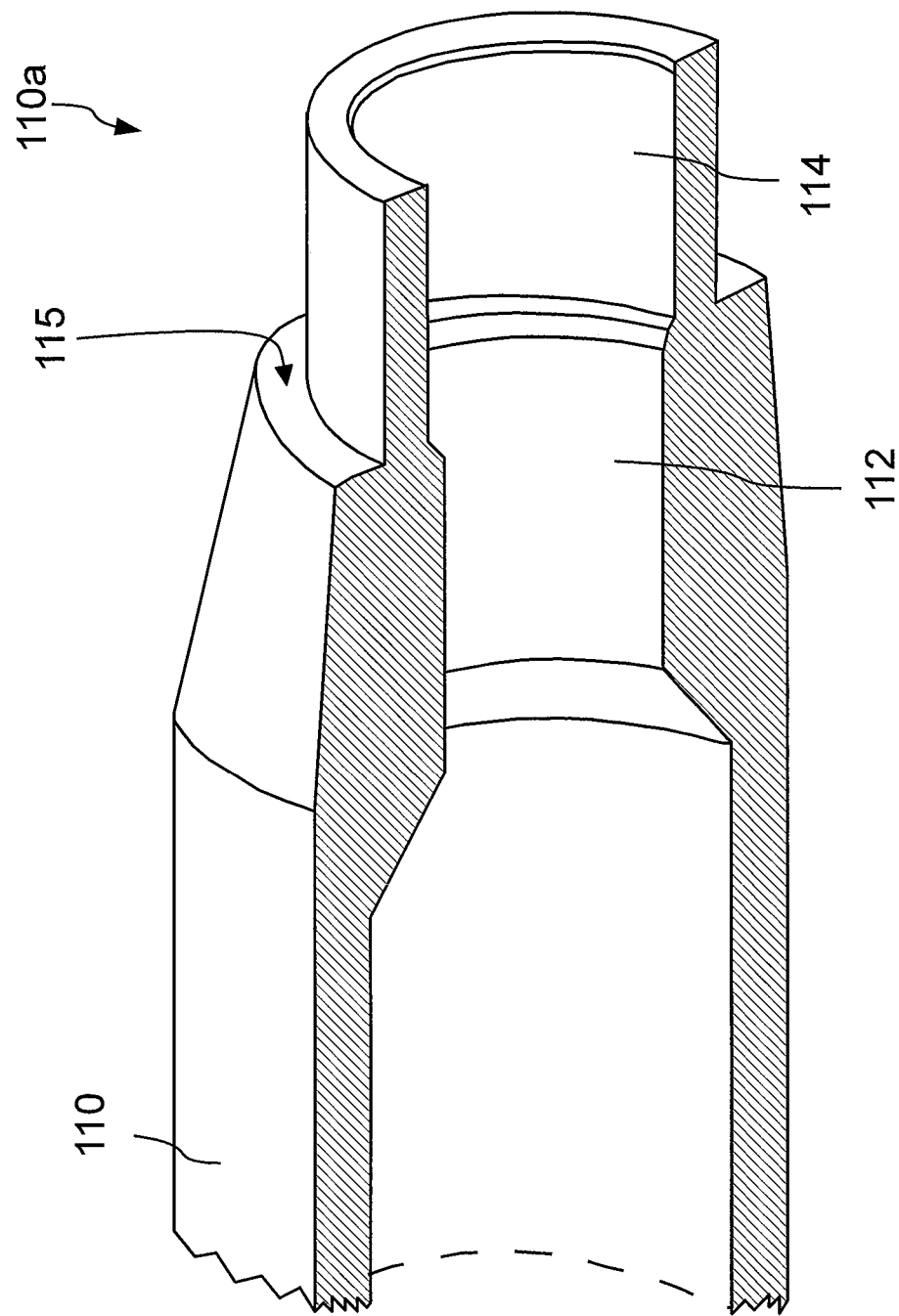

FIG. 3A schematically depicts a perspective view of said axial end section 110a of the first section 110 of the drive rod 100. Said second coupling means presently comprise an internal thread section 112 for engaging said external thread section 1312a' (FIG. 2A) of the bearing carrier 1312 and an internal press-fit section 114 (FIG. 3A, with an inner diameter id1, also cf. FIG. 3B) for engaging said external press-fit section 1312a'' (FIG. 2A) of the bearing carrier 1312. Thus, the bearing carrier 1312 may securely be attached to the first section 110 of the drive rod 100.

FIG. 3B schematically depicts a cross-sectional side view of the configuration of FIG. 3A. Optionally, a wave spring 116 may be provided on said axial end section 110a of the first section 110, said wave spring 116 resting on a shoulder 115 at an outer circumference of the axial end section 110a.

According to a further embodiment, said bearing carrier 1312 (FIG. 2A) comprises at its second axial end section 1312b an internal thread section 1312e', which facilitates using an assembling aid for securing the second axial bearing 1316 (FIG. 2B) to the bearing carrier 1312. For example, according to an embodiment, once the second axial bearing 1316 is placed on the second axial end section 1312b of the bearing carrier 1312, a threaded bolt and a wave spring (not shown in FIG. 2B) may be installed in/at said internal thread section 1312e' which enables to at least temporarily press said second axial bearing 1316 against the bearing carrier, particularly against the axial face 1312c" (FIG. 2A) of the intermediate bearing section 1312c.

Figure 4B:
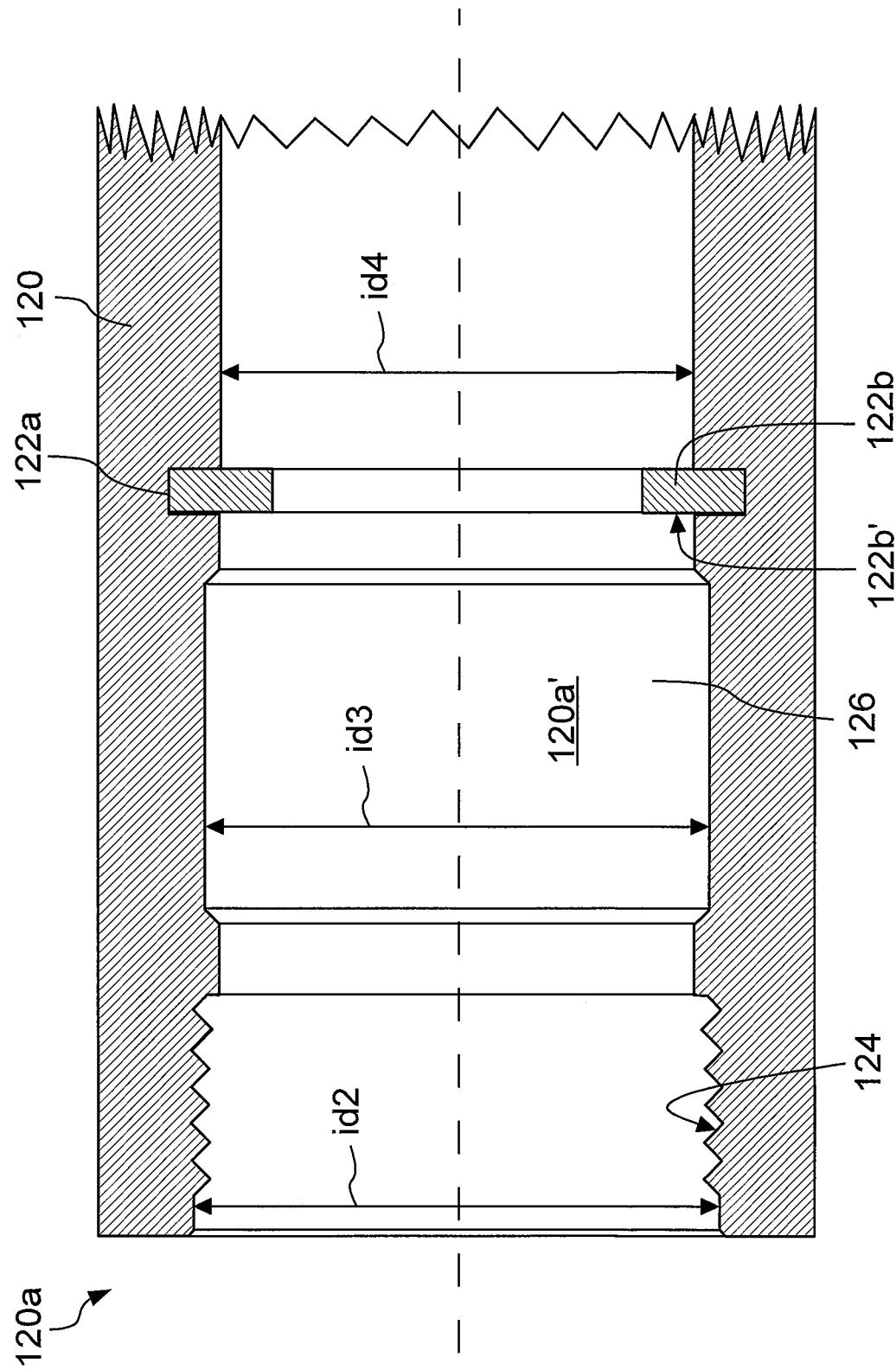

FIG. 4A schematically depicts a perspective view of an axial end portion 120a of the second section 120 of the drive rod 100 (FIG. 1A) according to an embodiment. FIG. 4B schematically depicts a cross-sectional side view of the configuration of FIG. 4A.

According to the present embodiment, said second section 120 comprises a hollow axial end section 120a' for receiving the bearing assembly 1310 (FIG. 4A) and locking means for locking said bearing assembly 1310 within said hollow axial end section 120a' and in a predetermined axial position relative to said second section 120. Said locking means comprise an annular shoulder, a locking ring 122b, which is arranged in a corresponding notch 122a, to limit an axial movement of the bearing assembly 1310 when inserting its second axial end section 1312b into the hollow axial end section 120a' of the second section 120. Further, a locking nut 128, cf. FIG. 5B, may be provided that has an external thread section 128a for engaging said internal thread section 124 (FIG. 4B) of the hollow axial end section 120a' of the second section 120.

As depicted by FIG. 4B, the second section 120 of the drive rod may comprise different inner diameters id2, id3, id4 along the axial end section 120a which will be explained further below.

Figure 5A:
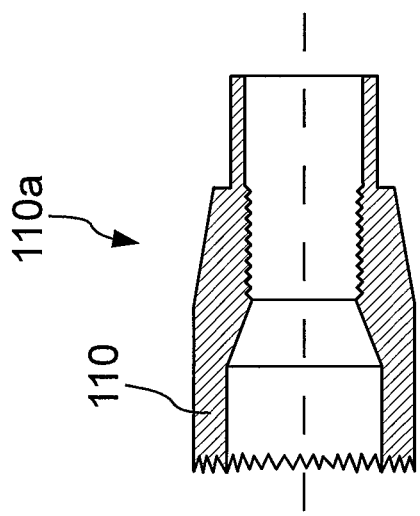
Figure 5B:
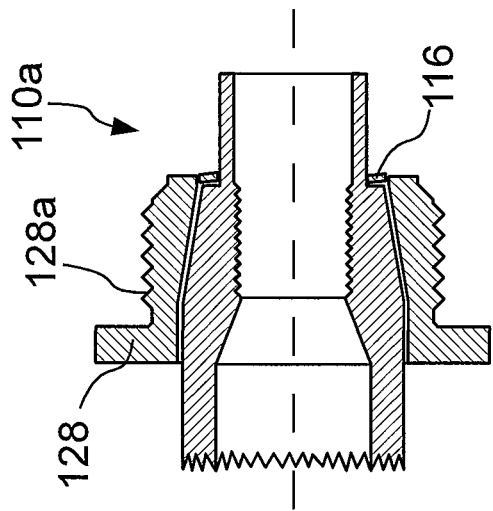

FIG. 5A to 5F schematically depict a cross-sectional side view of a drive rod 100 according to an embodiment in different subsequent states of manufacturing or assembly, respectively. FIG. 5A depicts the axial end section 110a of the first section 110. FIG. 5B depicts a subsequent assembly state where the locking nut 128 has been "mounted" to the axial end section 110a, e.g. by shifting it axially over said axial end section 110a. Note that the locking nut 128 has no internal thread, but rather a conical shape enabling an easy mounting on the correspondingly shaped outer surface of the axial end section 110a. After mounting the locking nut 128, an optional wave spring 116 may be positioned on the axial end section 110a as depicted by FIG. 5B, said wave spring 116 being supported by the shoulder 115 (FIG. 3A) of the first section 110.

Figure 5C:
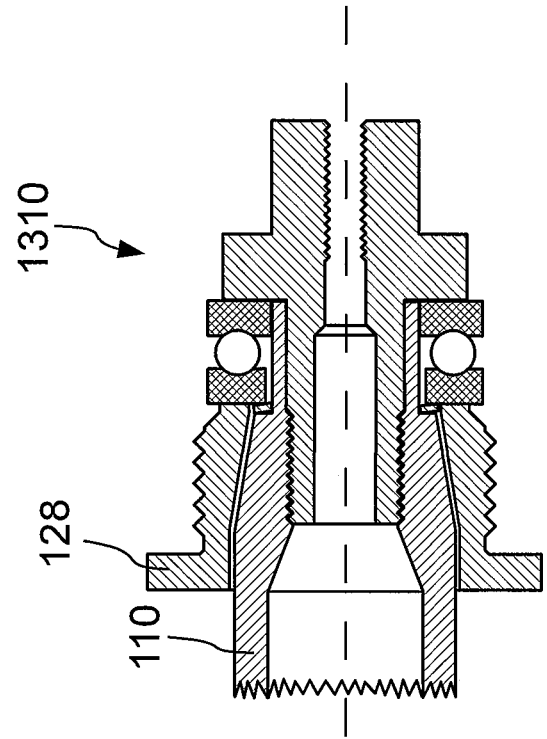

After that, according to FIG. 5C, the first axial bearing 1314 is mounted to the first section 110, e.g. axially shifted over an end section of said first section 110 in a horizontally left direction of FIG. 5C, until it makes contact with the wave spring 116. The axial spring force of the wave spring 116 resulting therefrom facilitates further mounting as it keeps in place the various components of the first axial bearing.

Figure 5D:
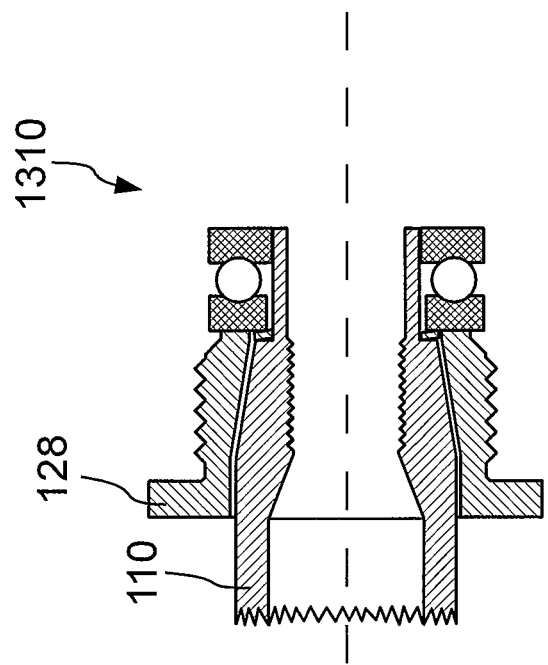

According to FIG. 5D, in a next step, the bearing carrier 1312 is mounted to the first section 110, which is presently effected by engaging the components 112, 114 of the first section 110 with the components 1312a', 1312a", as already explained above with reference to FIGS. 2A, 2B and 3A, 3B. Thereby, the first axial bearing 1314 is secured between the wave spring 116 and the bearing carrier 1312, whereby a monolithic subcomponent is obtained that may easily be handled. Particularly, the bearing assembly 1312 is firmly attached to the first section 110 by means of the thread sections 112, 1312a' and the press fit sections 114, 1312a" (FIG. 2A).

Figure 5F:
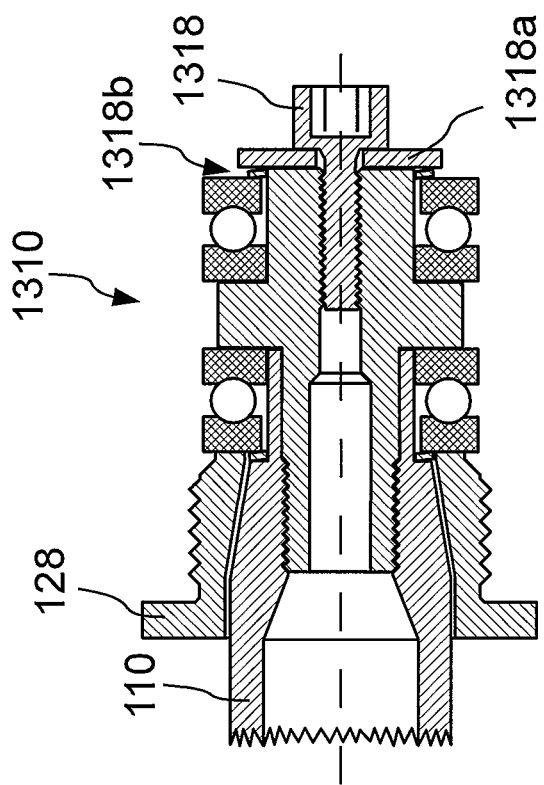
Figure 5E:
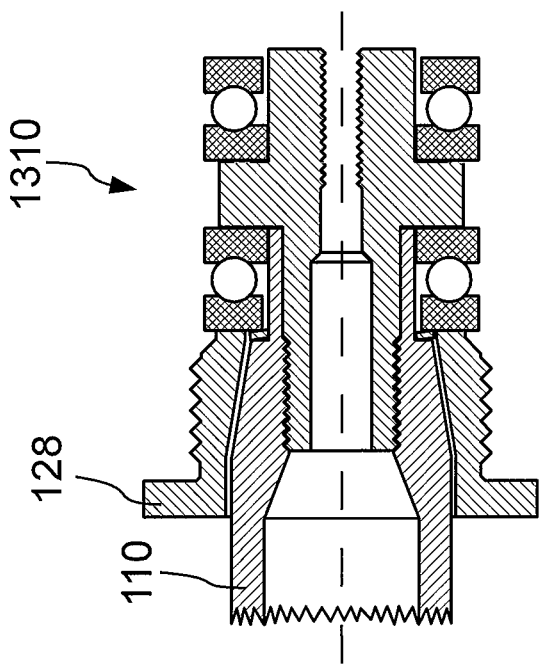

After this, according to FIG. 5E, the second axial ball bearing 1316 (FIG. 2B) is attached to the bearing carrier 1312, and, as can be seen from FIG. 5F, the second axial ball bearing 1316 (FIG. 2B) is secured to the bearing carrier 1312 by means of a threaded bolt 1318, a washer 1318a, and a second wave spring 1318b. This prevents the components 1316a, 1316b, 1316c from loosening or falling apart during the further steps of assembly of the drive rod.

Similarly, and as already mentioned above, the first axial ball bearing 1314 (FIG. 2B) is secured between the shoulder 115 (FIG. 3B), the wave spring 116, and an axial face 1312c' (FIG. 2A) comprising circular ring shape, similar to the axial face 1312c" of the bearing carrier 1312. This prevents the components 1314a, 1314b, 1314c from loosening or falling apart during the further steps of assembly of the drive rod.

During the complete assembly process of the drive rod 100 (FIG. 1A), the alignment and state of the involved components may be visually inspected, which reduces errors during assembly.

Figure 6:
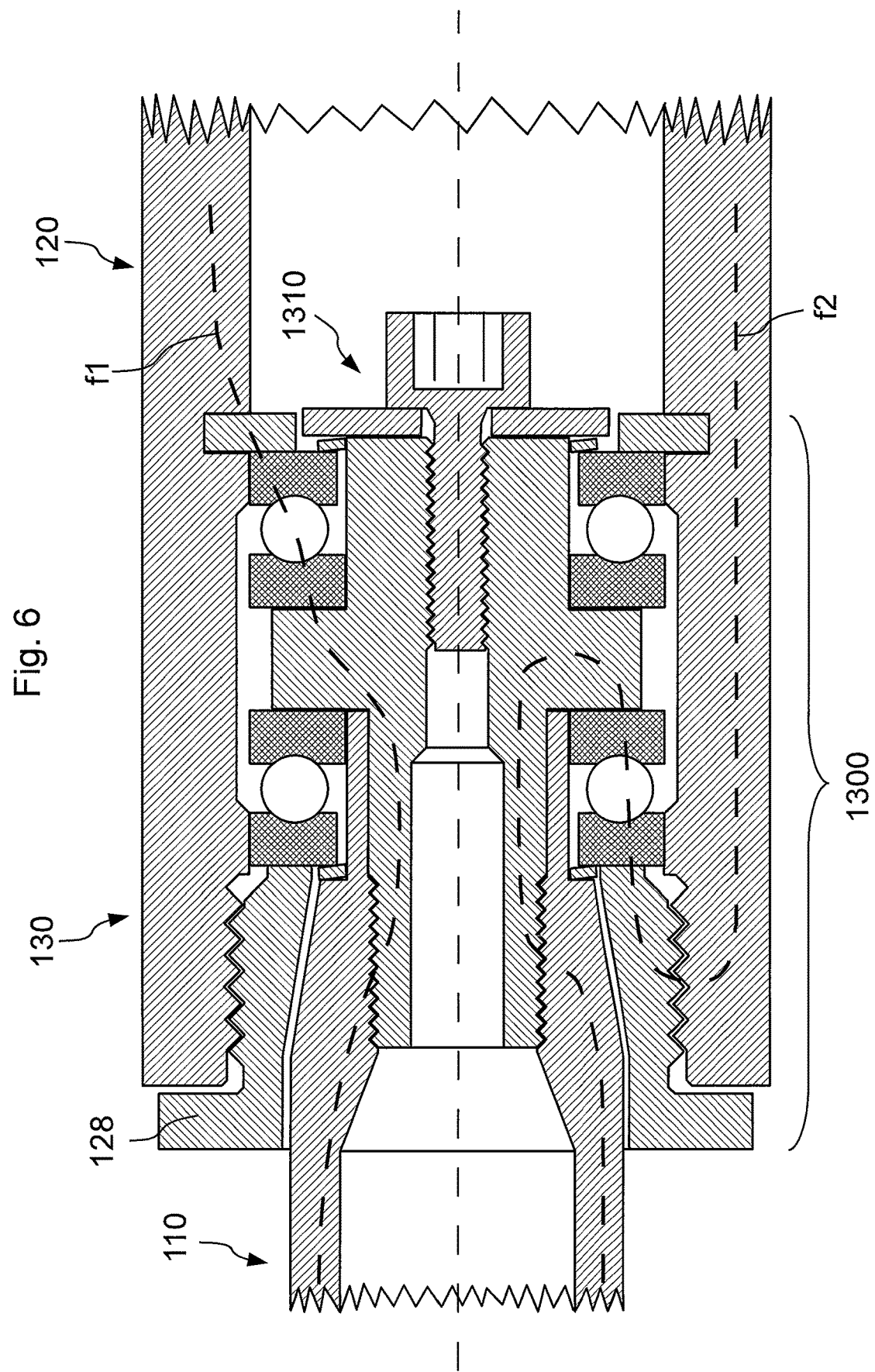

FIG. 6 depicts a final assembly state, where the subcomponent 110, 1310 as depicted by FIG. 5F has been inserted into the hollow axial end section 120a' (FIG. 4B) of the second section 120 and is locked therein by the locking means 128, 122b (FIG. 4A). Particularly, the locking nut 128 is tightened to said internal thread section of said hollow axial end section such that the bearing assembly 1310 is pressed by the locking nut 128 onto the face 122b' of the locking ring (FIG. 4B).

In this state, cf. FIG. 6, the axial force exerted by the locking nut 128 is guided through the left (FIG. 6) axial bearing 1314 (FIG. 4A), the intermediate bearing section 1312c, and the right axial bearing 1316 to the face 122b' of the locking ring.

Hence, the first axial bearing 1314 is enabled to transfer axial drag forces between the first and second sections 110, 112 of the drive rod 100 by axially pressing the first axial bearing 1314, and the second axial bearing 1316 is enabled to transfer axial thrust between said first and second sections 110, 120 by axially pressing the second axial bearing 1316. As an effect, the drive rod 100 according to the embodiments can be used to transfer axial forces between its first section 110 and its second section 120, while at the same time providing the abovementioned related to the free rotatability of the sections 110, 120 with respect to each other.

It is to be noted that in the assembly state of FIG. 6, the (optional) wave springs 116, 1318b are not involved anymore in the transmission of axial forces, as these axial forces are guided by the components 110, 1312, 1316, 122b, 120 (thrust case), also cf. the dashed line f1, or 110, 1312, 1314, 128, 120 (drag force), also cf. the dashed line f2, but not the wave springs 116, 1318b. These (optional) wave springs 116, 1318b are "bypassed" in the final assembly state depicted by FIG. 6.

The inner diameter id3 of the section 126 (FIG. 4B) is chosen such that the bearing carrier 1312 and the bearing shells 1314c, 1316a (which are coupled to each other in a torque proof manner in the final assembly state) may rotate freely within said section 120a', i.e. without making contact with the radially inner surface of the section 120a'.

Figure 7:
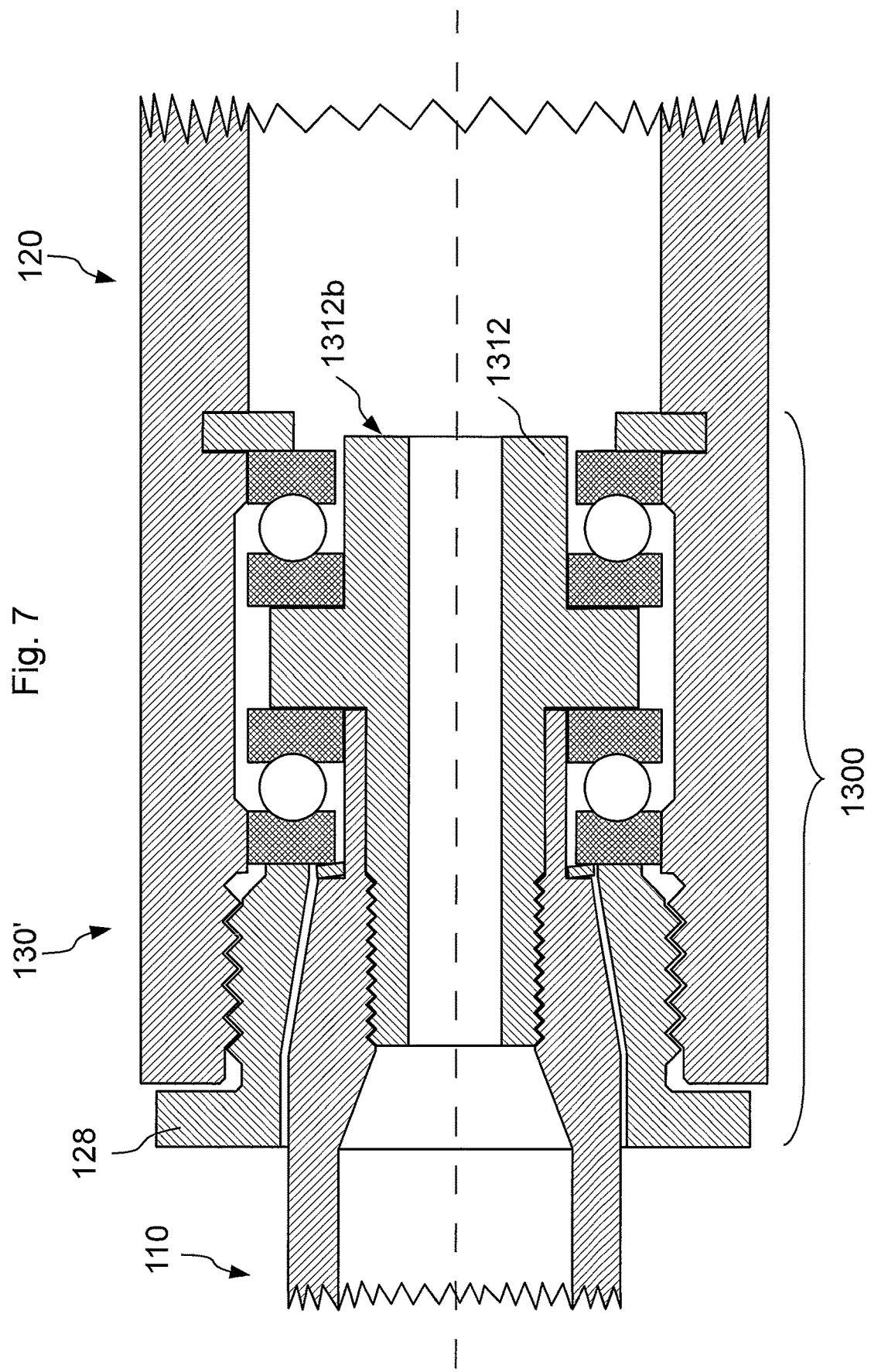

FIG. 7 schematically depicts a cross-sectional side view of a drive rod according to a further embodiment. In difference to the embodiment of FIG. 6, presently the intermediate section 130' comprises coupling means 1300 the bearing carrier 1312 of which does not comprise an inner thread for receiving a threaded bolt 1318 to aid an assembly as explained above. Optionally, also the left wave spring 116 (also cf. FIG. 5B) may be omitted, as it has no function in a fully assembled state of the drive rod.

The bearing assemblies of FIGS. 6 and 7 represent embodiments of the inventive coupling means 1300 for rotatably coupling the sections 110, 120 with each other. However, other configurations for the coupling means 1300 are also possible.

Figure 8:
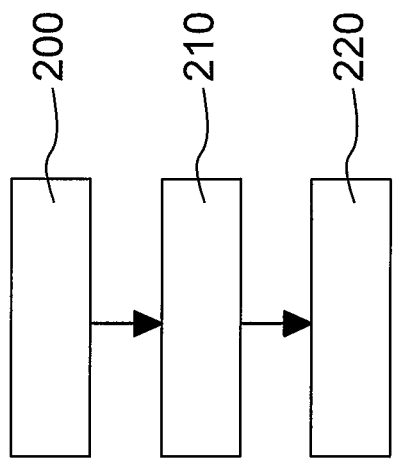

FIG. 8 schematically depicts a simplified flow-chart of a method of manufacturing a drive rod according 100 to an embodiment. In a first step 200, said first section 110 (FIG. 1A) is provided, e.g. in form of a hollow rod or pipe. In a subsequent step 210 (FIG. 8), similarly, said second section 120 is provided, again e.g. in form of a hollow rod or pipe. Finally, in step 220, said first section 110 is coupled to said second section with said coupling means 1300, which represent an intermediate section 130 of the drive rod 100 so obtained.

Figure 9:
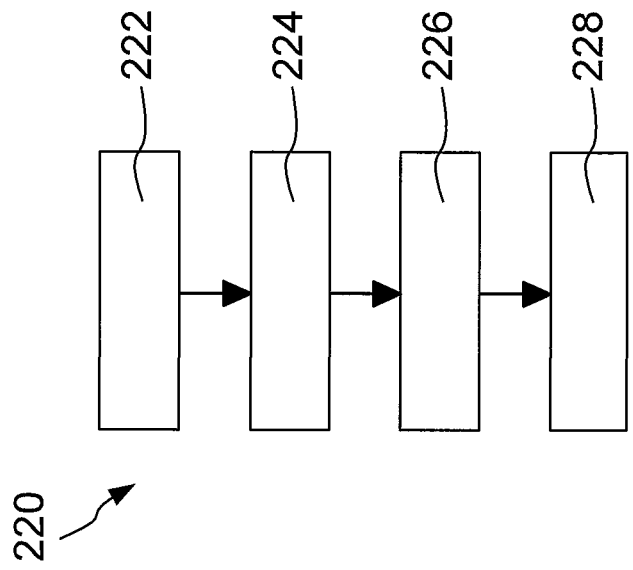

FIG. 9 schematically depicts a simplified flow-chart of aspects of a method of manufacturing a drive rod 100 according to a further embodiment.

In step 222, the locking nut 128 is mounted over the axial end section 110a of the first section 110, also cf. FIG. 5B. In subsequent step 224, the first axial end section 1312a of the bearing carrier 1312 is coupled with the axial end section 110a of said first section 110, cf. FIG. 5C. After that, in step 226, the second axial end section 1312b of the bearing carrier 1312 is inserted into the hollow axial end section 120a' of the second section 120, and in the further step 228, the bearing assembly 1310 is locked within said hollow axial end section 120a' and in a predetermined axial position relative to said second section 120 with said locking means 128, 122b (FIG. 6).

What we claim is:

1. A drive rod for driving a movable contact element of a high-voltage switching device, wherein the drive rod comprises a first section for connecting the drive rod to a drive mechanism, a second section for connecting the drive rod to the movable contact element, and an intermediate section between the first section and the second section, wherein the intermediate section comprises coupling means for rotatably coupling the first section to the second section so that the first section freely rotates with respect to the second section, wherein the coupling means comprise a bearing assembly having a bearing carrier, a first axial bearing arranged on the bearing carrier, and a second axial bearing arranged on the bearing carrier, wherein the first axial bearing and/or the second axial bearing is an axial ball bearing.

2. The drive rod according to claim 1, wherein the first section and the second section are coupled to each other by the coupling means so that any axial play between the first section and the second section is less than 3 millimeters.

3. The drive rod according to claim 1, wherein the first section and/or the second section has a basically hollow cylindrical shape, or wherein a respective axial end section of at least one of the first and second sections facing the coupling means comprise a basically hollow cylindrical shape.

4. The drive rod according to claim 1, wherein the bearing carrier comprises a first axial end section with a basically circular cylindrical shape having a first outer diameter, a second axial end section with a basically circular cylindrical shape having a second outer diameter for receiving the second axial bearing, and an intermediate bearing section with a basically circular cylindrical shape having a third outer diameter wherein the third outer diameter is greater than the first outer diameter and the second outer diameter.

5. The drive rod according to claim 4, wherein the bearing carrier comprises first coupling means for mechanically coupling the first axial end section of the bearing carrier to the first section of the drive rod, wherein the first coupling means comprise at least one of: an external thread section, an external press-fit section.

6. The drive rod according to claim 5, wherein the first section comprises second coupling means for engaging with the first coupling means of the bearing carrier, wherein the second coupling means comprise at least one of: an internal thread section for engaging the external thread section, an internal press-fit section for engaging the external press-fit section.

7. The drive rod according to claim 4, wherein the second axial end section comprises an internal thread section.

8. The drive rod according to claim 4, wherein the second section comprises a hollow axial end section for receiving the bearing assembly and locking means for locking the bearing assembly within the hollow axial end section and in a predetermined axial position relative to the second section, wherein the locking means comprise at least one of: an annular shoulder, a locking ring, a locking nut.

9. A high-voltage switching device comprising a movable contact element and a drive mechanism for driving the movable contact element, wherein the switching device comprises a drive rod according to claim 1, the drive rod connecting the drive mechanism with the movable contact element, wherein the drive mechanism comprises a crank gear.

10. A method of manufacturing a drive rod for driving a movable contact element of a high-voltage switching device, wherein the drive rod comprises a first section for connecting the drive rod to a drive mechanism, a second section for connecting the drive rod to the movable contact element, and an intermediate section between the first section and the second section, wherein the following steps: providing the first section providing the second section, and coupling the first section to the second section with coupling means that are configured for rotatably coupling the first section to the second section so that the first section freely rotates with respect to the second section, providing the coupling means which comprise a bearing assembly having a bearing carrier, providing a first axial bearing arranged on the bearing carrier, providing a second axial bearing arranged on the bearing carrier, and wherein the first axial bearing and/or the second axial bearing is an axial ball bearing.

11. The method according to claim 10, wherein the step of coupling further comprises the following steps: coupling a first axial end section of the bearing carrier with the axial end section of the first section, inserting a second axial end section of the bearing carrier into a hollow axial end section of the second section, locking the bearing assembly within the hollow axial end section and in a predetermined axial position relative to the second section with locking means, wherein the locking means comprise a locking nut and an annular shoulder within the hollow axial end section.

12. The method according to claim 11, wherein the hollow axial end section comprises an internal thread section, and wherein the locking nut comprises an external thread section for engaging with the internal thread section of the hollow axial end section, and wherein the annular shoulder is arranged axially inwards of the internal thread section, wherein the step of providing the first section comprises mounting the locking nut over an axial end section of the first section, and wherein the step of locking the bearing assembly within the hollow axial end section comprises tightening the locking nut to the internal thread section of the hollow axial end section until the bearing assembly is pressed onto the annular shoulder.

13. The method according to claim 11, wherein the method further comprises: at least temporarily securing at least one of the first and second axial bearings to the bearing carrier by means of at least one wave spring.

* * * * *